Patented Mar. 8, 1927.

1,619,869

UNITED STATES PATENT OFFICE.

LLOYD E. JACKSON, OF PITTSBURGH, PENNSYLVANIA.

METHOD OF TREATING HYDROCARBON OILS.

No Drawing.   Application filed October 4, 1923. Serial No. 666,619.

My invention relates to methods of purifying hydrocarbons, particularly hydrocarbon oils; and, still more specifically, to the recovery of naphtha, after it has been fouled and made dirty by use in cleaning clothing and other textile products by what is known as the dry process. The object in view is an operation which being entirely practicable and suited to industrial conditions, is at once simple, quickly accomplished, and inexpensive.

There are in use several methods for recovering dirty naphtha. They involve settling, filtering, centrifuging, distilling, or some combination of these treatments. The dirty naphtha is commonly treated with water, with caustic soda, caustic potash, or soda ash solution, or with sulphuric acid before it is finally settled, filtered, or centrifuged.

There are on the market a number of different kinds of filtering and caustic soda treating systems. In the filtering systems such materials as fuller's earth, canvas, felt, or the like, are used for the filtering media. In the caustic soda treating systems the dirty naphtha is washed or caused to flow through a strong caustic soda solution into a reservoir where the dirt, or the like, settle out.

Where dirty naphtha is recovered by what is known as "settling", it is put into a suitable tank or container and simply allowed to stand there until the dirt settles out of it. The dirty naphtha sometimes is washed or treated with a strong caustic soda solution or with an acid, such as sulphuric acid, prior to the settling. Naphtha recovered by allowing it to settle, either with or without preliminary treatment with sulphuric acid, contains all or most of the fatty substances removed from the materials washed in it, and from the soap added to it to increase its detergent properties, and furthermore it ordinarily is discolored. Fatty substances in the recovered naphtha are objectionable because in time they produce rancidity, and discoloration is objectionable because the discolored naphtha discolors light-colored materials cleaned in it. Naphtha recovered by first treating with caustic soda, caustic potash, sodium carbonate, or similar alkaline solution, followed by settling, contains only a small proportion of the fatty substances referred to above; but, unless the naphtha be treated with the proper quantity of alkaline solution (and here my invention is involved) colloidal conditions are produced, in consequence of which, if the treated naphtha is subsequently clarified by gravity separation, the separation is exceedingly slow. This means that naphtha so treated must be allowed to stand for a period of hours before it is ready to be used; or else the excess alkaline solution, the products of the treatment, and the dirt must be filtered out or otherwise removed, as by centrifugal force or by distillation. In this particular art the conditions hitherto have been such that, if centrifugal apparatus is not provided, and if separation be effected by gravitation merely, large stocks of naphtha must be carried and a number of settling tanks provided. And if centrifugal apparatus be provided then the expenses of installation and of operation have to be taken into account, as well as the inconveniences incident to installation and operation, and incidental losses in material employed.

Recovery of dirty naphtha may be achieved by filtration or centrifugal separation without previous treatment with chemicals. The disadvantage under either of these methods of recovery is that the fatty materials dissolved in the naphtha are not removed. The time necessary for recovery by either of these methods is usually less than by the ordinary methods of gravity separation, but the losses due to evaporation and incident to operation are greater than the advantage gained by saving time.

Distillation is an effective method of recovery, because all the dirt and foreign matter in the used naphtha are removed. However, the process is an expensive one when compared to proper chemical treatment. Furthermore, naphtha recovered by chemical treatment and in accordance with the invention which I am about to describe, is of a superior quality for dry-cleaning purposes because it is dry and contains small quantities of soap which, to use the term of the industry, soften it.

Coloring matter is not efficiently removed from dirty naphtha by any of the processes described above, except by distillation.

I have discovered that if dirty naphtha taken from a dry-cleaning washer be treated with an alkaline solution, such as caustic soda, caustic potash, soda ash, or the like, in such a measured quantity that the acid materials, consisting mostly of fatty acids, are exactly neutralized (or substantially so: the practice admits of adding the reagent somewhat in excess of the exact theoretical quantity) in the presence of the proper quantity of water, flocks of soap are formed. The water referred to as present in the foregoing reaction is the water which is introduced as a constituent of the alkaline solution. I shall presently return to the matter of the strength of this solution, and it is upon the strength of the solution that the quantity of water present depends. The reaction is in my intended procedure carried out at atmospheric temperature or substantially so. The length of time consumed, as well as other details of operation, will presently be mentioned. In consequence of reaction under the particular conditions indicated flocks of soap, as I have just mentioned, are formed. And these flocks settling rapidly to the bottom of the container, carry with them all the suspended dirt, or the like, in the naphtha. The formation of the soap flocks is (as I have said) not impaired even in the presence of a slight excess of alkaline solution. In the course of my experiments, soap flocks were produced in naphtha which had been used previously for dry-cleaning purposes; also in naphtha, hydrocarbon oils and vegetable and animal oils to which fatty acids or dry-cleaning soap had for purposes of experimentation been added. I have discovered that suspended matter may be removed from naphtha, and from the other materials mentioned by first adding fatty acid or suitable dry-cleaning soap (that is to say, dry-cleaning soap which contains fatty acid) to the naphtha and then neutralizing the fatty acid with an equivalent quantity of an alkaline solution, such as caustic soda, caustic potash, soda ash, or the like. Soap in flocculent form is thrown out, and this flocculent soap settling rapidly carries with it the matter initially suspended in the liquid.

I have further found that if ethyl alcohol be present in the liquid when the soap flocks are forming, their formation will be denser and the ensuing settlement will be more rapidly accomplished, and I have found that best results are obtained by adding first an aqueous solution of alkali of the strength I have indicated, and subsequently and with the alcohol addition, an additional quantity of water.

In order to determine the proper quantity of alkali necessary to neutralize the fatty acids contained in a given batch of used naphtha, an accurately measured sample of the batch may be mixed with neutralized alcohol and titrated with a standard solution of caustic soda, using phenolphthalein as an indicator, by methods well known to any chemist. The quantity of caustic soda, caustic potash, soda ash, or other suitable alkaline substance, necessary to neutralize the acid in the entire batch may then be calculated from data obtained by titration.

I have found caustic potash to be a suitable alkali for my purpose. Since water is necessary to produce the soap flocks, I have found it convenient to add the caustic potash in an aqueous solution having a specific gravity of 1.23. A stronger or a weaker solution might of course be used, through a specific gravity range of 1.05 to 1.30, and under certain circumstances I find it advantageous to modify the strength of the solution. However, a 1.23 sp. gr. solution contains the quantity of water which produces the desired results under the conditions ordinarily obtaining.

I have also found that if an adsorbing material, such as activated charcoal or carbon in other form, fuller's earth, or the like, be mixed with the dirty naphtha, or other hydrocarbon material under treatment, either before or after the formation of the soap flocks, coloring matter as well as suspended dirt will be removed. The soap flocks coagulate the dirt and adsorbing material and cause them to settle out rapidly. In order to produce the best results, the adsorbing material should preferably be added in finely divided condition. Ordinarily when such a powder is added to such oily material as is here contemplated, it tends to remain in suspension and can only be removed by filtration, centrifugal force, distillation, or by allowing the material to stand for a long time. In the presence of the soap flocks produced as described above the adsorbing material is removed in a short length of time.

The following is a description of the process of recovery as I practice it commercially.

The used naphtha coming from the dry-cleaning operation and containing dirt, or the like derived from the materials cleaned, and containing also dry-cleaning soap which has been added to it for the purpose of increasing its detergent properties, is collected in a tank containing 2500 gallons for example. When the tank has been filled with the dirty naphtha, its contents are agitated by means of a circulating pump, so that they are thoroughly mixed. A sample of 100 c. c. is then taken from the tank and is titrated with a standard solution of caustic soda, in order to determine how much of the standard solution is required to effect the desired reaction. From the data thus obtained the required quantity of caustic potash solution necessary for neutralizing the free fatty acid in the 2500 gallons tank is calculated. The required quantity of caustic potash solution, of 1.23 sp. gr., with an excess (preferably not more than 10% of the required quantity)

is then added to the 2500 gallons of dirty naphtha in the tank and the contents of the tank are agitated thoroughly. After about 5-minutes, well defined flocks of soap are produced. Then from 5 to 15 lbs. of finely ground activated charcoal, depending on the quantity of coloring matter to be removed, are stirred into the contents of the tank. After 10 to 15 minutes additional agitation, from 1 to 3 gallons of denatured ethyl alcohol is added. The alcohol causes the flocks to become better defined and subsequently to settle into a more compact mass in the bottom of the tank. After about 5 minutes further agitation, the agitation is discontinued and the contents of the tank are allowed to settle. Where the treatment is carried out under these conditions, clear naphtha can be pumped from the tank within 15 minutes after the agitation is stopped.

In a typical case twenty-five hundred gallons of dirty naphtha will require say three quarts of the alkaline solution of 1.23 sp. gr. But it will be understood that the actual quantity necessary (determined in each case by titration) will depend directly upon the condition of the dirty naphtha, in respect to the percentage of fatty acid adulterant present, and this manifestly is widely variable. As to the strength of the solution (and consequently the amount of water present) I give the typical figure 1.23 sp. gr. This figure will be varied by the practitioner as in his experience he deals with one kind of fatty acid or another. Some latitude is permissible with respect to the strength of solution, but with respect to the amount of alkali so introduced the practitioner will follow what I have said,—the exact amount, with an excess of not more than ten per cent. It is good practice to have the solution, relatively speaking, strong, and then at the end add more water as presently I shall indicate.

The dirt, adsorbing material, soap, and the like, which collect in the bottom of the tank as a sludge, are removed by means of a pump. The fatty acid in this sludge has been recovered on a laboratory scale and I propose to recover it on commercial scale by the following procedure: the sludge is collected in a suitable tank and treated with strong sulphuric acid. The acid causes the sludge to separate into three layers. The top layer contains naphtha and fatty acid. The other two layers contain water, sulphuric acid, dirt, adsorbing material, and a small quantity of naphtha. The two lower layers are run into the sewer and the top layer is subsequently treated to separate the naphtha and the fatty acid. In order to bring this about the mixture is treated with a quantity of caustic soda solution sufficient to neutralize the fatty acid. Water may then be stirred into the mixture to cause the soap to separate as flocks. But in no case will the addition of water here pass beyond the point where the separation of flocks is assisted and where softening of and solution of the flocks begins.

The mixture is filtered to separate the soap flocks from the naphtha. The latter is collected in a naphtha storage tank to be used again for cleaning purposes or otherwise. The former are placed in another tank and treated with dilute sulphuric acid. Two layers are formed in the tank. The top layer is a concentrated solution of fatty acid in naphtha which is suitable as it is for making dry-cleaning soap and is collected for this or other purpose. (The naphtha present in the soap flocks even after filtration is the naphtha which is actually an integral part of the flocks and is inseparable by filtration from them). The lower layer is run to the sewer.

The improvements claimed for this process over the ordinary methods for recovering dirty naphtha which have been used for dry-cleaning purposes is that the recovery entails a cost less than any other satisfactory method of recovery; the recovered naphtha is sweet and free from foreign odor and free from discoloring substances, and is a more efficient cleaning agent than naphtha recovered by distillation, which is probably the most efficient method of recovery hitherto practiced.

I have described my invention as I have perfected it, as a method of recovering naphtha which has served in the commercial operation of dry-cleaning. But I have indicated and now repeat that the operation is applicable generally for the removal from hydrocarbon oils and other mineral oils and vegetable and animal oils of fatty acid impurities and solid matter in suspension.

In the ensuing claims I use the term, oils and fats, and I mean to include within that term, under the foregoing specification, mineral spirit or naphtha, petroleum oils, hydrocarbons, and other mineral oils, and vegetable and animal oils.

I claim as my invention:

1. The method herein described of removing from a mineral hydrocarbon oil a fatty-acid impurity together with foreign matter in suspension, which consists in adding to the material to be treated a measured quantity of alkali in aqueous solution, sufficient to neutralize the fatty acid present, with a margin of excess not exceeding ten per cent of the amount required to effect exact neutralization, allowing the consequent precipitate to settle carrying with it into sediment the foreign matter in suspension, and separating from such sediment the purified oil.

2. The method herein described of cleaning used naphtha in which fatty acid is present together with foreign matter in suspension, which consists in adding to the used naphtha a measured quantity of an aqueous solution of caustic potash having a specific gravity of approximately 1.23 sufficient to neutralize the fatty acid present, with a margin of excess not exceeding ten per cent of the amount required to effect exact neutralization, allowing the consequent precipitate to settle carrying with it into sediment the foreign matter in suspension, and separating from such sediment the purified naphtha.

In testimony whereof I have hereunto set my hand.

LLOYD E. JACKSON.